United States Patent
Tanabe et al.

(10) Patent No.: US 10,258,885 B2
(45) Date of Patent: Apr. 16, 2019

(54) GAMING DEVICE, NON-TRANSITORY STORAGE MEDIUM, GAMING METHOD, AND GAMING SYSTEM

(71) Applicant: NINTENDO CO., LTD., Kyoto (JP)

(72) Inventors: Kensuke Tanabe, Kyoto (JP); Yukio Morimoto, Kyoto (JP); Kaoru Kita, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 164 days.

(21) Appl. No.: 15/420,435

(22) Filed: Jan. 31, 2017

(65) Prior Publication Data

US 2017/0239575 A1    Aug. 24, 2017

(30) Foreign Application Priority Data

Feb. 19, 2016    (JP) .................... 2016-030397

(51) Int. Cl.
*A63F 13/60* (2014.01)
*A63F 13/537* (2014.01)
*A63F 13/80* (2014.01)

(52) U.S. Cl.
CPC ............ *A63F 13/60* (2014.09); *A63F 13/537* (2014.09); *A63F 13/80* (2014.09)

(58) Field of Classification Search
CPC ........ A63F 13/60; A63F 13/80; A63F 13/537; G07F 17/3204
USPC ......................................... 463/31
See application file for complete search history.

(56) References Cited

U.S. PATENT DOCUMENTS

| | | | | |
|---|---|---|---|---|
| 6,488,582 B1* | 12/2002 | Suzuki | ............. | A63F 13/10 463/31 |
| 2007/0087801 A1* | 4/2007 | Kotani | ............. | A63F 13/10 463/8 |
| 2013/0252682 A1* | 9/2013 | Umekawa | ........... | A63F 13/79 463/1 |
| 2014/0018168 A1* | 1/2014 | Sugiyama | ......... | A63F 13/537 463/31 |

FOREIGN PATENT DOCUMENTS

| | | |
|---|---|---|
| JP | 2012-191678 | 8/2012 |
| JP | 2014-045967 | 3/2014 |

* cited by examiner

*Primary Examiner* — David L Lewis
*Assistant Examiner* — Shauna-Kay N. Hall
(74) *Attorney, Agent, or Firm* — Nixon & Vanderhye PC

(57) ABSTRACT

The game processor consumes paints of a plurality of colors to execute an attack in the game, reflects an effect of the attack in the game, and decreases possession paints according to consumption of the paints. The game processor consumes the paints of the plurality of colors according to consumption ratios determined for the attack to be executed and executes the attack. When at least one of the parameters necessary for the action to be executed is insufficient, the game processor changes the consumption ratios of the paints of the plurality of colors and executes the action. When the consumption ratios change, the game processor generates a game screen different from a game screen when the consumption ratios do not change. When the consumption ratios change, the game processor reflects an effect different from an effect when the consumption ratios do not change in the game.

21 Claims, 12 Drawing Sheets

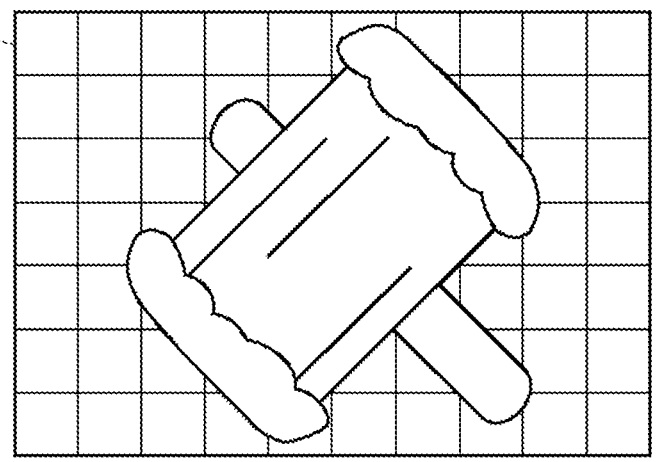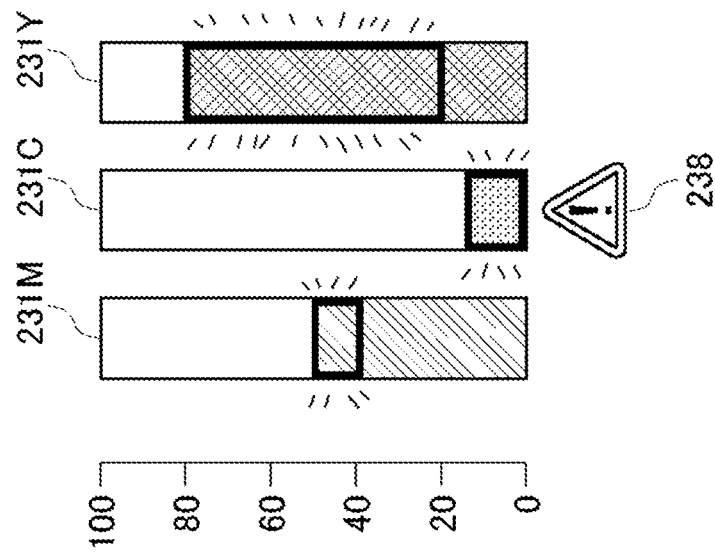
FIG. 9

GAMING DEVICE, NON-TRANSITORY STORAGE MEDIUM, GAMING METHOD, AND GAMING SYSTEM

CROSS REFERENCE TO RELATED APPLICATION

This nonprovisional application is based on Japanese Patent Application No. 2016-030397 filed with the Japan Patent Office on Feb. 19, 2016, the entire contents of which are hereby incorporated by reference.

FIELD

The present disclosure relates to a gaming device executing a game on the basis of an operation of a user, a non-transitory storage medium, a gaming method, and a gaming system.

BACKGROUND AND SUMMARY

Conventionally, a gaming device that sets parameters (also called points) or items to execute a predetermined action (for example, an attack of a player character in a battle game) in a game, and executes the action by consuming the parameters or the items is known (for example, JP 2014-045967 A).

However, in the gaming device according to the related art, when the parameters do not satisfy amounts of parameters necessary for executing the action, that is, amounts of parameters consumed by the action, the action cannot be executed.

An object of the present disclosure is to provide a gaming device that can adjust amounts of parameters consumed in an action in a game executing the action that consumes the parameters.

The present disclosure provides a gaming device for executing a game on the basis of an operation of a user. The gaming device includes a memory device configured to store individual values of a plurality of parameters to be consumed; and a game processor configured to consume at least one of the plurality of parameters to execute a predetermined action in the game, reflect an effect of the executed action in the game, decrease the values of the parameters stored in the memory device, according to consumption of the parameters, and generate a game screen displayed on a display device. Individual consumption ratios of the plurality of parameters are determined for the action. The game processor consumes at least one of the plurality of parameters according to the consumption ratios determined for the action to be executed and executes the action, when at least one of the parameters necessary for the action to be executed is insufficient, the game processor changes the consumption ratios and executes the action, when the consumption ratios change, the game processor generates a game screen different from a game screen when the consumption ratios do not change, and when the consumption ratios change, the game processor reflects an effect different from an effect when the consumption ratios do not change in the game.

By this configuration, in the game in which the plurality of parameters is consumed at the predetermined consumption ratios to execute the action, even when any one of the plurality of parameters is insufficient, the action can be executed. However, as compared with the case in which there is no insufficient parameter, an effect by the action changes and the user can confirm the change in the consumption ratios of the parameters on the game screen.

In an exemplary embodiment, when the consumption ratios change, the game processor may generate a game screen in which colors different from colors when the consumption ratios do not change are displayed.

By this configuration, the user is able to know which of a plurality of kinds of parameters is insufficient, by the colors displayed on the game screen.

In an exemplary embodiment, the game processor may execute an action selected by a user from a plurality of actions in which determined consumption ratios are different from each other.

By this configuration, the user can select any action from the plurality of actions and can execute the action.

In an exemplary embodiment, the game processor may generate game images including images of cards corresponding to the plurality of actions, the plurality of parameters corresponds to different colors, and consumption ratios of different colors may be determined for each of the plurality of actions.

By this configuration, the plurality of parameters to execute the action is displayed with the different colors. Therefore, the user can easily recognize a residual amount of each parameter.

In an exemplary embodiment, the game processor may color a card selected by the user with a color combination corresponding to the consumption ratios and when there is an insufficient parameter, the game processor may decrease a coloring area of a color corresponding to the insufficient parameter, according to an insufficient amount.

By this configuration, the user can visually confirm insufficiency of the parameter by coloring of the card.

In an exemplary embodiment, the game processor may adjust a total consumption amount of the plurality of parameters to execute the action, on the basis of the operation of the user, may consume the plurality of parameters according to the adjusted total consumption amount, and may reflect an effect according to amounts of the consumed parameters in the game.

By this configuration, the magnitude of the effect can be changed according to the consumption amounts of the parameters. Therefore, an amusement property of the game can be improved.

In an exemplary embodiment, the game processor may generate game images showing the individual values of the plurality of parameters stored in the memory device.

By this configuration, the user can visually grasp a consumable amount (residual amount) of each of the plurality of parameters.

In an exemplary embodiment, the game processor may increase or decrease each of the plurality of parameters stored in the memory device, by a factor other than consumption of the parameters by execution of the action.

By this configuration, the parameters to execute the action are increased or decreased by the factor other than the execution of the action. Therefore, an amusement property of the game can be improved.

In an exemplary embodiment, the action may be an attack which a player character operated by the user makes on another character and the effect may be damage which the another character receives.

By this configuration, a battle game in which an attack is made on an enemy character using the plurality of parameters is provided.

Further, the present disclosure provides a non-transitory storage medium having stored therein a game program causing a computer, having a memory device and connected to a display device, to perform: storing which stores individual values of a plurality of parameters to be consumed in a game in the memory device; a first game processing which consumes at least one of the plurality of parameters to execute a predetermined action in the game; a second game processing which reflects an effect of the executed action in the game; and a third game processing which generates a game screen displayed on the display device. In this case, the first game processing consumes at least one of the plurality of parameters according to consumption ratios determined for the action to be executed and executes the action and when at least one of the parameters necessary for the action to be executed is insufficient, the first game processing changes the consumption ratios and executes the action. The storing decreases the values of the parameters stored in the memory device, according to consumption of the parameters. When the consumption ratios change, the third game processing generates a game screen different from a game screen when the consumption ratios do not change. When the consumption ratios change, the second game processing reflects an effect different from an effect when the consumption ratios do not change in the game.

By this configuration, in the game in which the plurality of parameters is consumed at the predetermined consumption ratios to execute the action, even when anyone of the plurality of parameters is insufficient, the action can be executed. However, as compared with the case in which there is no insufficient parameter, an effect by the action changes and the user can confirm the change in the consumption ratios of the parameters on the game screen.

In an exemplary embodiment, when the consumption ratios change, the third game processing may generate a game screen in which colors different from colors when the consumption ratios do not change are displayed.

By this configuration, the user is able to know which of a plurality of kinds of parameters is insufficient, by the colors displayed on the game screen.

In an exemplary embodiment, the third game processor may generate a game screen to display a plurality of actions in which determined consumption ratios are different from each other and the first game processor may execute an action selected by a user from the plurality of actions displayed by the third game processor.

By this configuration, the user can select any action from the plurality of actions and can execute the action.

In an exemplary embodiment, the third game processor may generate game images including images of cards corresponding to the plurality of actions, the plurality of parameters corresponds to different colors, and consumption ratios of different colors may be determined for each of the plurality of actions.

By this configuration, the plurality of parameters to execute the action is displayed with the different colors. Therefore, the user can easily recognize a residual amount of each parameter.

In an exemplary embodiment, the third game processor may color a card selected by the user with a color combination corresponding to the consumption ratios and when there is an insufficient parameter, the third game processor may decrease a coloring area of a color corresponding to the insufficient parameter, according to an insufficient amount.

By this configuration, the user can visually confirm insufficiency of the parameter by coloring of the card.

In an exemplary embodiment, the first game processor may adjust a total consumption amount of the plurality of parameters to execute the action, on the basis of the operation of the user, and may consume the plurality of parameters according to the adjusted total consumption amount and the second game processor may reflect an effect according to amounts of the consumed parameters in the game.

By this configuration, the magnitude of the effect can be changed according to the consumption amounts of the parameters. Therefore, an amusement property of the game can be improved.

In an exemplary embodiment, the third game processor may generate game images showing the individual values of the plurality of parameters stored in the memory device.

By this configuration, the user can visually grasp a consumable amount of each of the plurality of parameters.

In an exemplary embodiment, the storage device may increase or decrease each of the plurality of parameters stored in the memory device, by a factor other than consumption of the parameters by execution of the action.

By this configuration, the parameters to execute the action are increased or decreased by the factor other than the execution of the action. Therefore, the amusement property of the game can be improved.

In an exemplary embodiment, the action may be an attack which a player character operated by the user makes on another character and the effect may be damage which the another character receives.

By this configuration, a battle game in which an attack is made on an enemy character using the plurality of parameters is provided.

Further, the present disclosure provides a gaming method for executing a game on the basis of an operation of a user. The gaming method includes a first game processing which consumes at least one of a plurality of parameters to be consumed and executing a predetermined action in the game; a second game processing which reflects an effect of the executed action in the game; a third game processing which decreases values of the parameters, according to consumption of the parameters; and a fourth game processing which generates a game screen displayed on a display device. Individual consumption ratios of the plurality of parameters are determined for the action. In the first game processing, at least one of the plurality of parameters is consumed according to the consumption ratios determined for the action to be executed and the action is executed and when at least one of the parameters necessary for the action to be executed is insufficient, the consumption ratios are changed and the action is executed. In the fourth game processing, when the consumption ratios change, a game screen different from a game screen when the consumption ratios do not change is generated. In the second game processing, when the consumption ratios change, an effect different from an effect when the consumption ratios do not change is reflected in the game.

By this configuration, in the game in which the plurality of parameters is consumed at the predetermined consumption ratios to execute the action, even when anyone of the plurality of parameters is insufficient, the action can be executed. However, as compared with the case in which there is no insufficient parameter, an effect by the action changes and the user can confirm the change in the consumption ratios of the parameters on the game screen.

Further, the present disclosure provides a gaming system for executing a game on the basis of an operation of a user. The gaming system includes a memory device configured to store individual values of a plurality of parameters to be consumed by a user; a game processor configured to consume at least one of the plurality of parameters to execute a predetermined action in the game, reflect an effect of the executed action in the game, and decrease the values of the parameters stored in the memory device, according to consumption of the parameters; and a display device configured to display a game screen. Individual consumption ratios of the plurality of parameters are determined for the action. The game processor consumes at least one of the plurality of parameters according to the consumption ratios determined for the executed action and executes the action and when at least one of the parameters necessary for the action to be executed is insufficient, the game processor changes the consumption ratios and executes the action. When the consumption ratios change, the game processor reflects an effect different from an effect when the consumption ratios do not change in the game. When the consumption ratios change, the display device displays a game screen different from a game screen when the consumption ratios do not change.

By this configuration, in the game in which the plurality of parameters is consumed at the predetermined consumption ratios to execute the action, even when anyone of the plurality of parameters is insufficient, the action can be executed. However, as compared with the case in which there is no insufficient parameter, an effect by the action changes and the user can confirm the change in the consumption ratios of the parameters on the game screen.

The foregoing and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 9 is a diagram showing an example of a relation of residual amounts of possession paints and coloring of an item card in accordance with the embodiment;

DETAILED DESCRIPTION OF NON-LIMITING EXAMPLE EMBODIMENTS

Hereinafter, an embodiment of the present disclosure will be described with reference to the drawings. The embodiment described below is an example when the present disclosure is carried out and the present disclosure is not limited to a specific configuration described below. When the present disclosure is carried out, a specific configuration according to the embodiment may be appropriately adopted.

Figure 1:
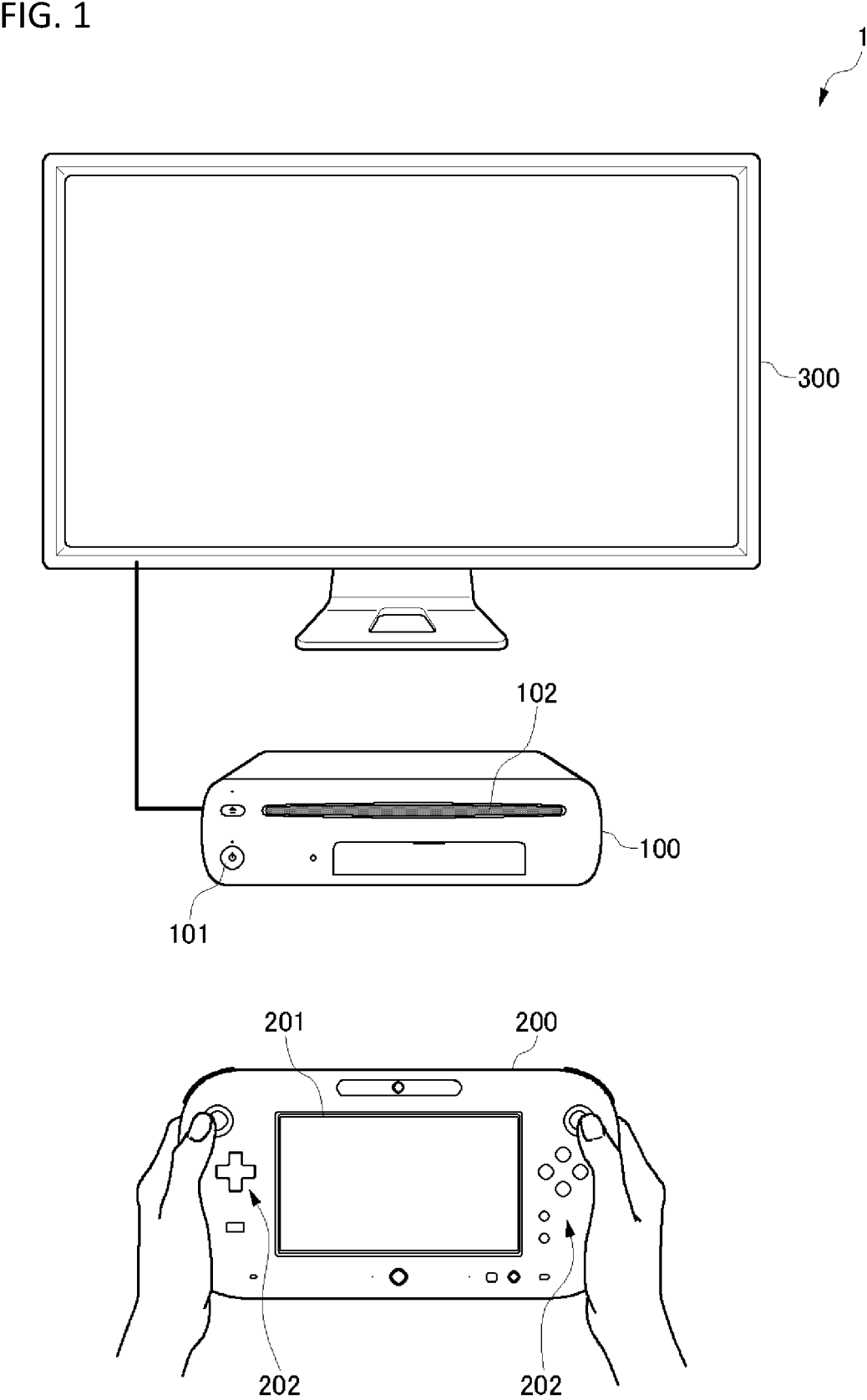
FIG. 1 is a diagram showing a configuration of one example of a gaming system based on the present embodiment.

FIG. 1 is a diagram showing a configuration of one example of a gaming system based on the present embodiment. A gaming system 1 includes a gaming machine body 100, a controller 200, and a monitor 300. The gaming machine body 100 is of a stationary type and includes a main power button 101 and a slot 102 to insert game software media on which game software is recorded, as main components. The controller 200 has an approximately plate shape and includes a touch panel monitor 201 provided in a center portion of the front thereof and various operation members 202 such as a button and a lever are disposed around the touch panel monitor 201. As an example of the monitor 300, a monitor of a television receiver can be used.

Figure 2:
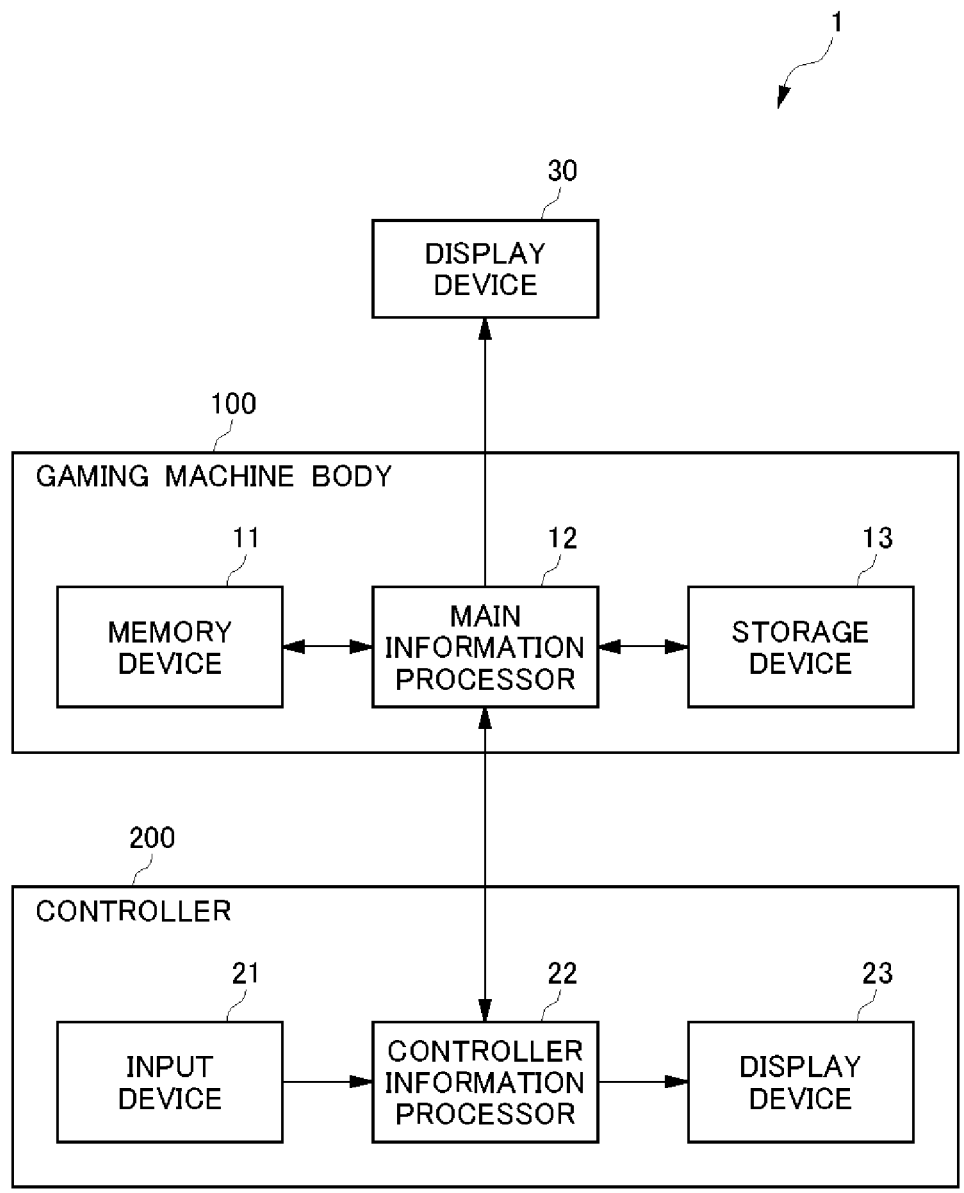
FIG. 2 is a block diagram showing an example of a configuration of a gaming system according to an embodiment.

FIG. 2 is a block diagram showing an example of a configuration of the gaming system according to this embodiment. In the gaming system 1 shown in FIG. 2, a display device 30 corresponds to the monitor 300 of FIG. 1. The gaming machine body 100 includes a memory device 11, a main information processor 12, and a storage device 13. The controller 200 includes an input unit 21, a controller information processing unit 22, and a display device 23. The input unit 21 corresponds to the operation members 202 and a touch panel of the controller 200. The touch panel and the display device 23 configure the touch panel monitor 201.

The controller 200 and the gaming machine body 100 perform communication with each other and the gaming machine body 100 and the display device 30 also perform communication with each other. In this embodiment, wireless communication using a wireless LAN is performed between the controller 200 and the gaming machine body 100 and wired communication using an HDMI (registered trademark) cable is performed between the gaming machine body 100 and the display device 30. In FIG. 2, illustration of a communication module or a communication interface to perform the communication is omitted.

Operation information input to the input unit 21 is transmitted from the controller 200 to the gaming machine body 100. In addition, display information processed by the main information processor 12 is transmitted from the gaming machine body 100 to the controller 200. The controller information processing unit 22 generates a screen to be displayed on the display device 23, using the display information received from the main information processor 12 and the operation information input from the input unit 21.

The communication between the gaming machine body 100 and the controller 200 may be the wired communication and the communication between the gaming machine body 100 and the monitor 300 may be the wireless communication. In addition, the gaming system 1 according to this embodiment is not limited to the stationary type shown in FIG. 1 and may be configured as a portable gaming machine in which the gaming machine body 100, the controller 200, and the monitor 300 are integrated.

The main information processor 12 of the gaming machine body 100 executes game processing. Hereinafter, the main information processor 12 to execute the game processing is also called a game processor. The game software downloaded through the Internet is stored in the storage device 13. The game processor 12 reads the game software stored in the storage device, executes the game software, and executes the game processing. In addition, the game processor 12 may read the game software media inserted into the slot 102 and may execute the game software.

The memory device 11 is used as a temporary storage area when the game processor 12 executes the game processing. In this embodiment, particularly, a plurality of paint parameters (to be described in detail below) that can be used by a player character is stored in the memory device 11. The game processor 12 executes the game processing according to the game software, on the basis of operation information of a user received from the controller 200, and generates a game screen for the display device 30 and a game screen for the display device 23 according to a game processing result. The game screen for the display device 30 is transmitted to the display device 30 and is displayed on the display device 30 and the game screen for the display device 23 is transmitted to the display device 23 and is displayed on the display device 23.

A game developed by the game software according to this embodiment will be described. The game is an action adventure with a battle scene. The player character can possess three kinds of (red, blue, and yellow) paints of different colors and can possess item cards. Amounts (residual paint amounts) of the paints (possession paints) possessed by the player character are stored as parameters showing the amounts in the memory device 11.

The possession paints of the player character satisfy predetermined conditions and amounts thereof increase. The possession paints are consumed by exercising an attack selected by the item card in the battle scene and amounts thereof decrease. In addition, even when a specific attack (attack to absorb the paints) is received from an enemy character in the battle scene, the amounts of possession paints decreases. The item card can be obtained by satisfying the predetermined conditions, the item card is consumed by making the attack using the item card, and the item card is erased from the possession item cards.

Figure 3:
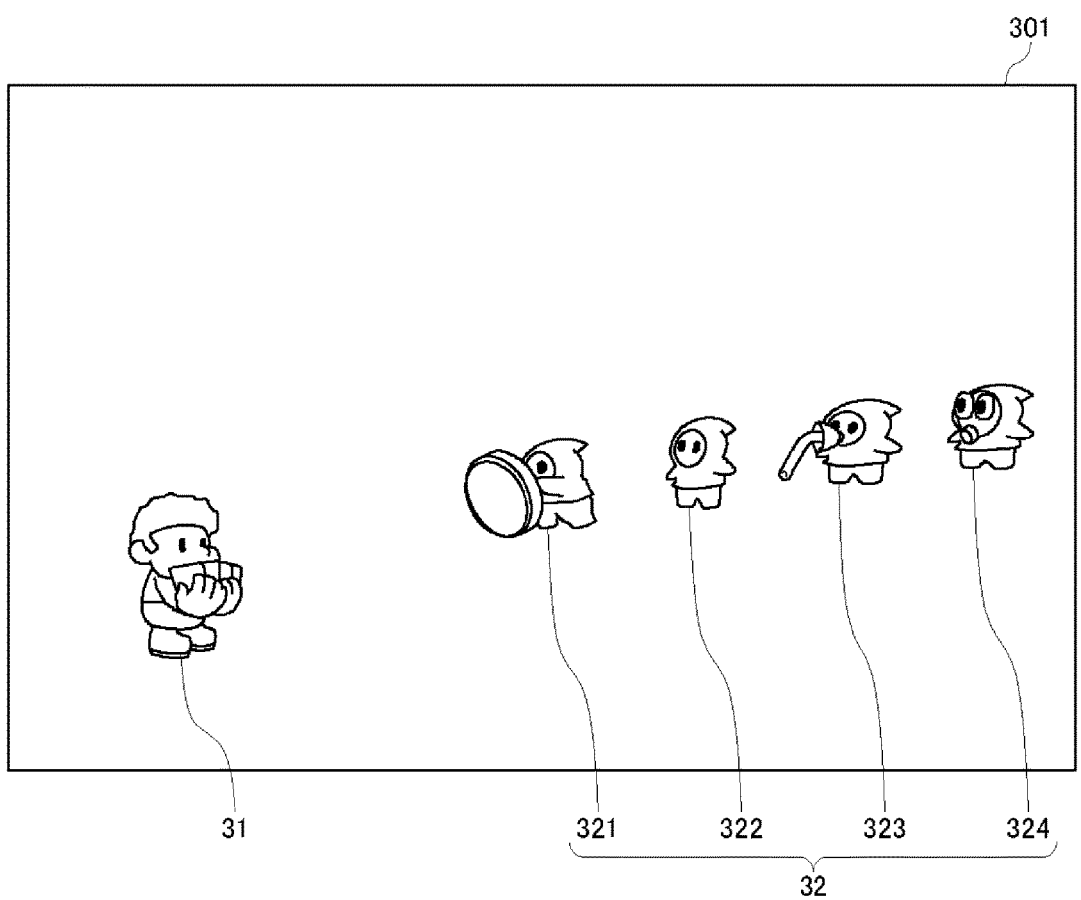
FIG. 3 is a diagram showing an example of a game screen displayed on a monitor in a battle scene in accordance with the embodiment.
Figure 4:
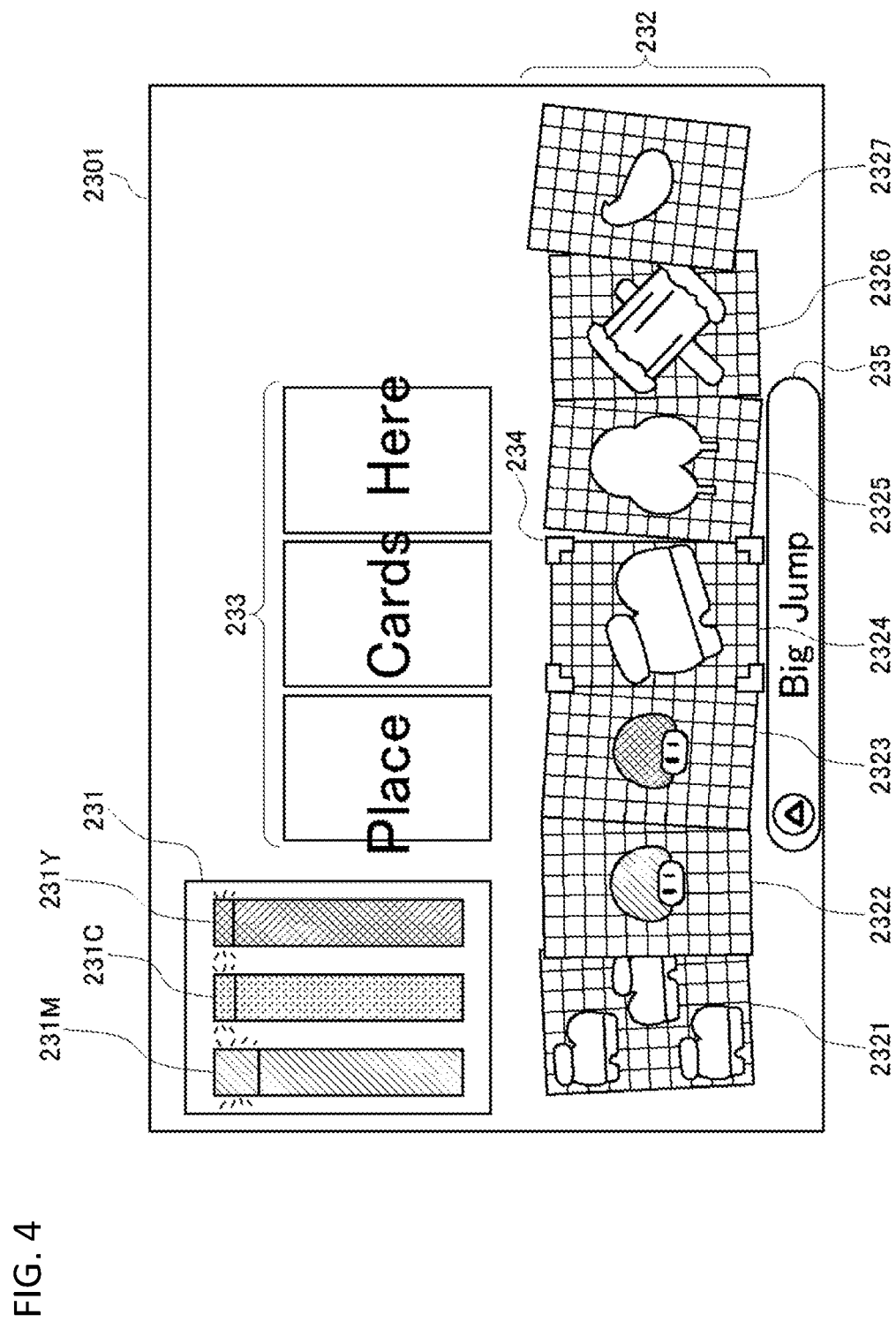
FIG. 4 is a diagram showing an example of a game screen displayed on a touch panel monitor in a battle scene in accordance with the embodiment.

FIG. 3 is a diagram showing an example of a game screen displayed on the display device 30 (monitor 300) in the battle scene. FIG. 4 is a diagram showing an example of a game screen displayed on the display device 23 (touch panel monitor 201) of the controller 200 in the battle scene. In the game screen of FIG. 3, a player character 31 confronts a plurality of enemy characters 32 (321 to 324). At this time, in the touch panel monitor 201 of the controller 200, as shown in FIG. 4, a game screen 2301 to select kinds of attacks used in the battle is displayed.

In the game screen 2301, a paint parameter display portion 231 to display the residual amounts of the possession paints of the player character is displayed on an upper left portion of the game screen, a plurality of item cards 232 (2321 to 2327) possessed by the player character is arranged horizontally and displayed on a lower portion of the game screen, and a card selection area 233 to arrange the selected item cards (selection cards) is displayed on a center portion of an upper portion of the game screen.

There are the plurality of kinds of attacks and kinds and magnitudes of damages given to the enemy characters are different according to the kinds of the attacks. In addition, in the enemy characters 32, a method of receiving the damage when the same attack is received is different according to the kind of each enemy character. The attack is selected by selecting the item card 232. That is, the item card 232 represents the kind of the attack.

In the paint parameter display portion 231, three kinds of parameters of a red possession paint 231M, a blue possession paint 231C, and a yellow possession paint 231Y are shown by indicators showing values (residual amounts) thereof by heights. The user moves a cursor 234 horizontally and selects the item card. In the example of FIG. 4, the cursor is placed on the item card 2324 and explanation of the item card 2324 on which the cursor is placed is displayed on a card explanation area 235.

As described above, the possession paints are consumed by exercising the attack selected by the item card 232. However, amounts (consumption ratios) of possession paints of individual colors to be consumed are different for each item card 232. The consumption ratios for each item card 232 are defined in the game software. In the game screen 2301, an amount of paint of each color consumed by the attack of the item card on which the cursor is placed flickers on the indicator. As a result, the user can visually understand the amount of paint of each color to be consumed by using the item card on which the cursor is placed. In addition, not only the item card 232 consuming the plurality of colors at predetermined consumption ratios but also the item card 232 consuming (a consumption ratio of 100%) only one color may exist.

The user arranges the item card 232 selected by operating the input device 21 on the card selection area 233. Specifically, the user drags and drops the item card 232, which the user desires to select, to the card selection area 233 using the touch panel or presses a predetermined button in a state in which the cursor is placed on the item card 232, which the user desires to select, so that the user can arrange the item card 232 on the card selection area 233. The user can select a maximum of three item cards 232.

In the game screen 2301 of FIG. 4, the item cards 2322 and 2323 are cards supplementing the red paint and the yellow paint, respectively, and the red and yellow possession paints increase by predetermined amounts by selecting these cards.

Figure 5:
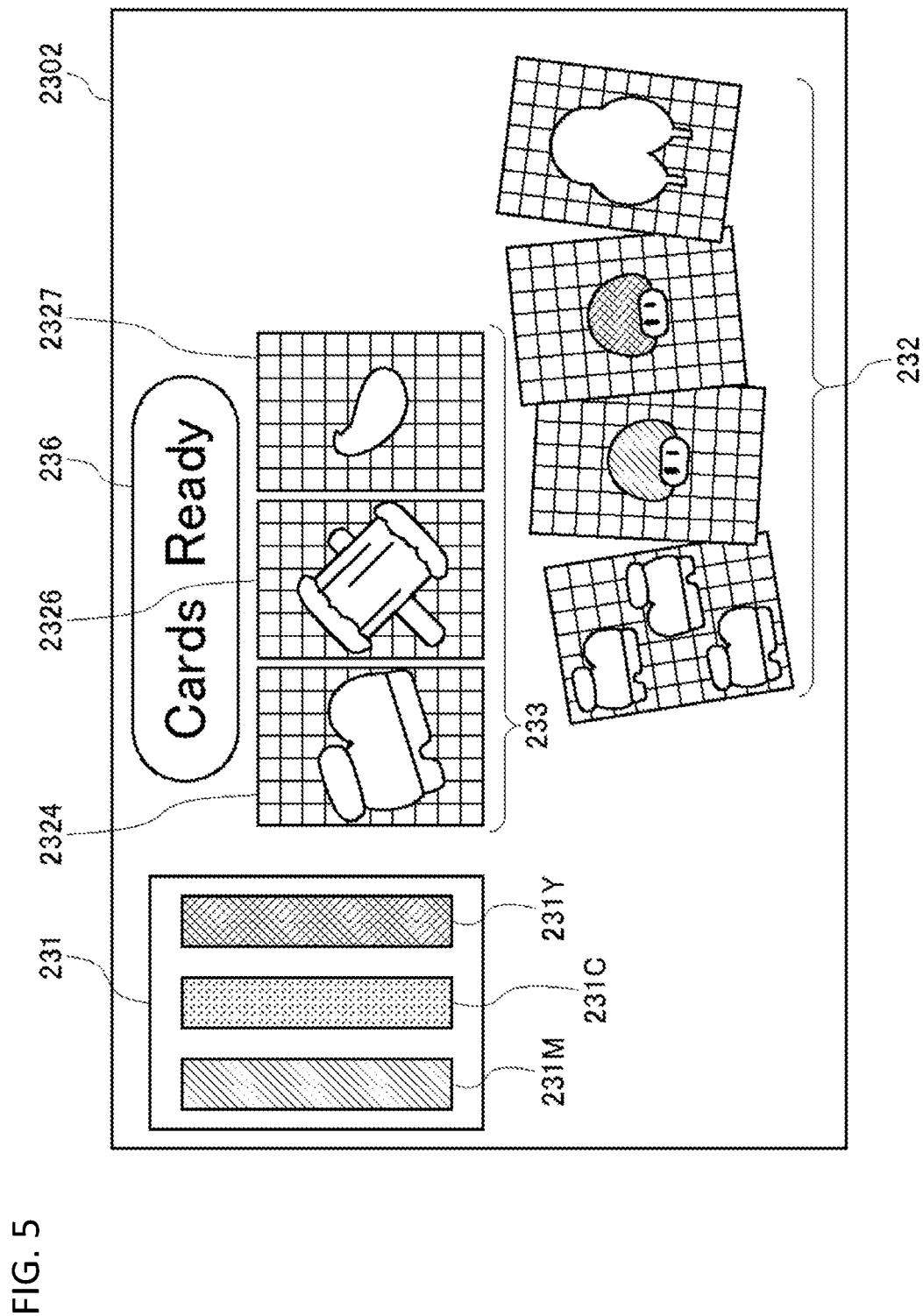
FIG. 5 is a diagram showing an example of a game screen when a user selects an item card in accordance with the embodiment.

FIG. 5 is a diagram showing an example of a game screen displayed on the display device 23 when the user selects the item cards. In a game screen 2302 of FIG. 5, the item cards 2324, 2326, and 2327 are selected and are arranged on the card selection area 233. In this state, if a selection completion button 236 is designated (tapped), the selection cards are determined and the display device proceeds to a game screen 2303 of FIG. 6.

Figure 6:
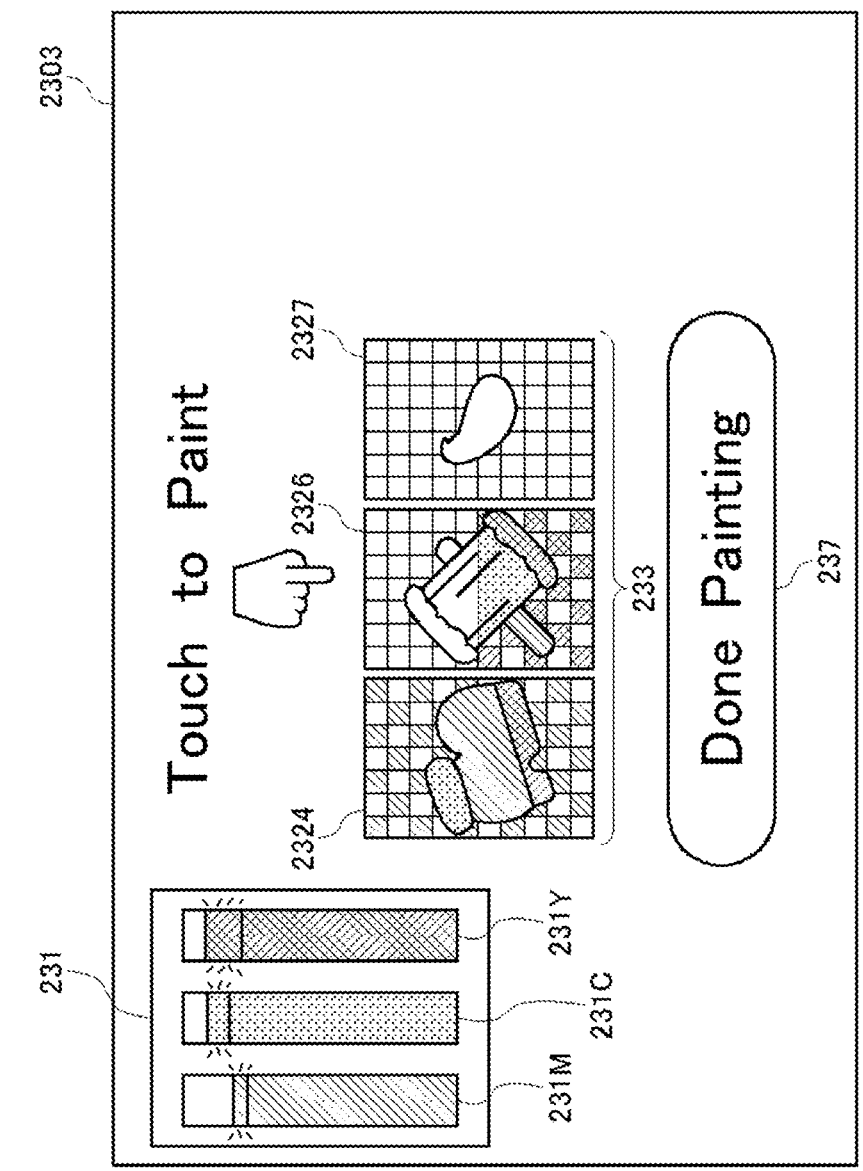
FIG. 6 is a diagram showing an example of a game screen when a selection card is determined in accordance with the embodiment.

FIG. 6 is a diagram showing an example of a game screen displayed on the display device 23 when the selection cards are determined. In the game screen 2303 of FIG. 6, the user sets an attack capability of each of the selected item cards. The attack capability means the strength of the attack of each item card, that is, the magnitude of the damage given to the enemy characters. The user can set the attack capability to any value in a range of 0% to 100%.

The possession paints are consumed according to the magnitude of the attack capability. For example, in the item card 2324 of "Big Jump" on which the cursor is placed in the game screen 2301 of FIG. 4, when the attack capability is 100%, a consumption amount of the red paint is 80, a consumption amount of the blue paint is 10, and a consumption amount of the yellow paint is 10. If the attack capability of the item card 2324 is set to 50%, the attack capability (an amount of damage given to the enemy characters) becomes 50% and consumption amounts of paints of the individual colors also become 50% (the red paint is 40, the blue paint is 5, and the yellow paint is 5). As such, the user can select the kind of the attack and the attack capability (a total consumption amount of paints) thereof as an action executed by the player character.

Specifically, the user can set the attack capability by touching each of the cards placed on the card selection area 233. The attack capability increases from 0% to 100%, according to touching time. In the game screen 2302 of FIG. 5, the item card 232 is colored gradually from a lower side of the item card 232 according to the touching time. In FIG. 6, the attack capability of 100% is set to the item card 2324, the attack capability of about 60% is set to the item card 2326, and the attack capability is not yet set to the item card 2327.

A consumption ratio of the paint of each color consumed by each item card is almost matched with a ratio of each color colored on the item card when the item card is completely colored from the lower side to the upper side (when the attack capability is set to 100%). That is, the item card is colored with a color combination corresponding to the consumption ratio. Therefore, the user colors each item card, so that the user can visually grasp which consumption ratio the item card consumes the paint of each color at.

Figure 7:
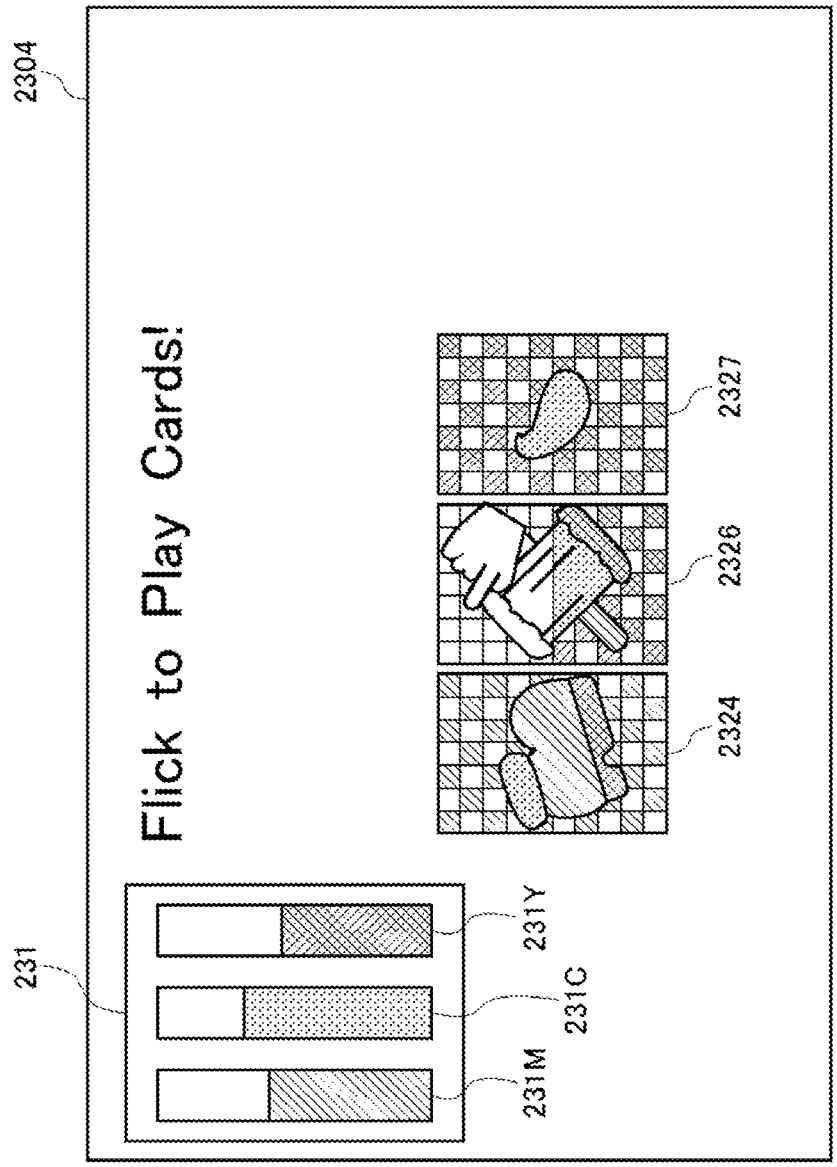
FIG. 7 is a diagram showing an example of a game screen displayed after an action is determined in accordance with the embodiment.

If the attack capability is set to each item card (attack) selected by the user and a coloring end button 237 is tapped, contents of the attack executed as the action by the player character are determined and the display device 23 proceeds to a game screen of FIG. 7. FIG. 7 is a diagram showing an example of the game screen displayed after the action including the kind of the attack and the attack capability is determined. If the user flicks the item card on the card selection area 233 in an upward direction (toward the monitor 300 when the user holds the controller at the posture of FIG. 1) in a game screen 2304, the selection card of the card selection area 233 is inserted and the display device 30 proceeds to a game screen of FIG. 8.

In a step in which the selection cards are colored in the game screen 2303 of FIG. 6, the residual amounts of possession paints of the individual colors displayed on the parameter display portion 231 decrease. However, in this step, the paints are not yet consumed in actuality. If the colored selection card is inserted by performing flicking in the game screen 2304 of FIG. 7, consumption of the paint is determined. In a step of the game screen 2304 of FIG. 7, the display device returns to the previous screen and resetting of the attack capability is enabled. Then, the display device returns to the further previous screen and reselection of the item card is enabled.

Figure 8:
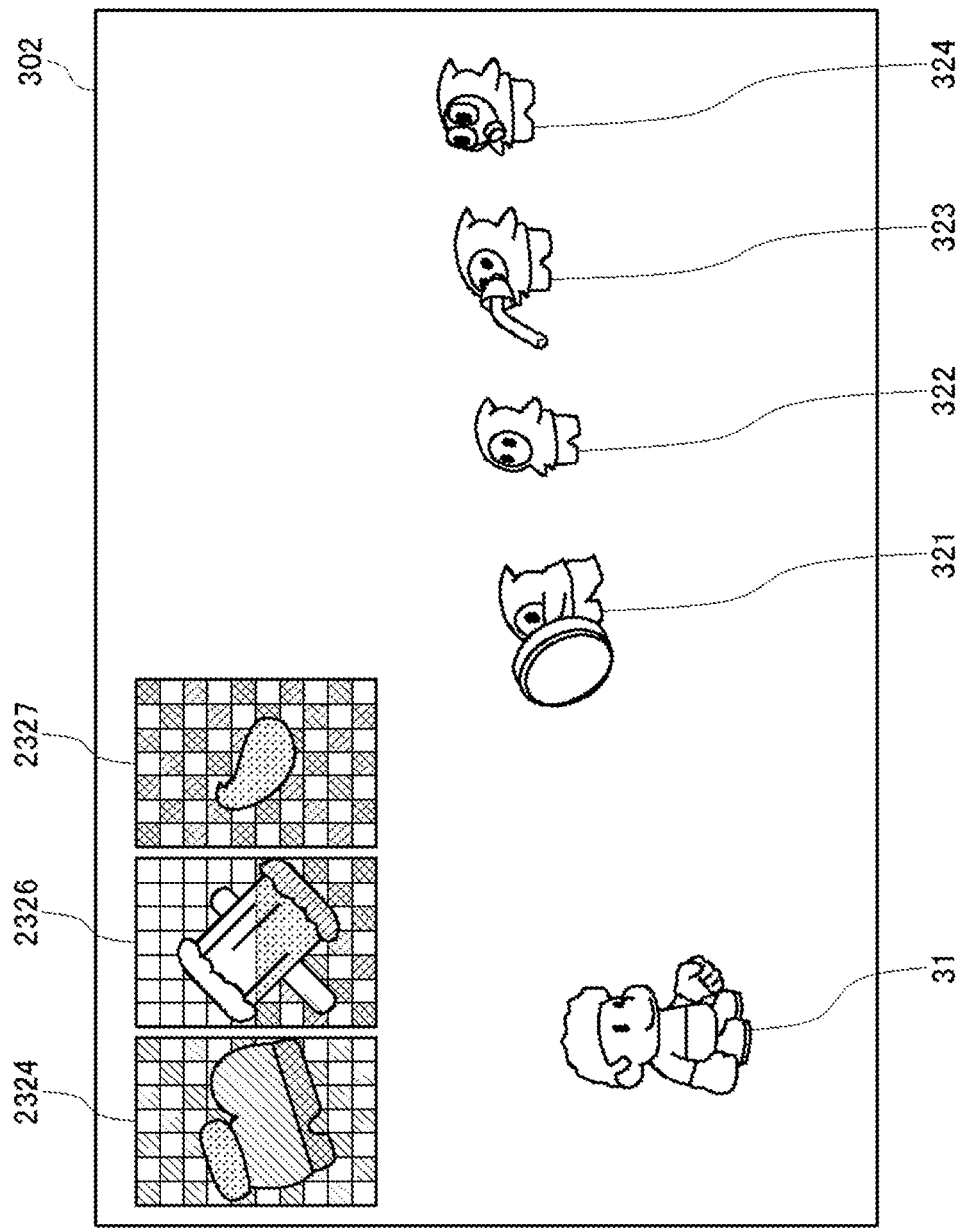
FIG. 8 is a diagram showing an example of a game screen showing a battle scene in which an attack preparation is completed in accordance with the embodiment.

FIG. 8 is a diagram showing an example of a game screen showing a battle scene in which an attack preparation is completed in a state in which selection cards are inserted and kinds and attack capabilities of attacks are set. The inserted item cards (insertion cards) are displayed on an upper left portion of a game screen 302. The user selects any one of the insertion cards, selects one enemy character to make an attack by the insertion card, and makes the attack. Then, the player character receives the attack from the enemy character. In this way, a turn-based battle in which the player character and the enemy character alternately make the attack is performed in the battle scene.

Figure 10:
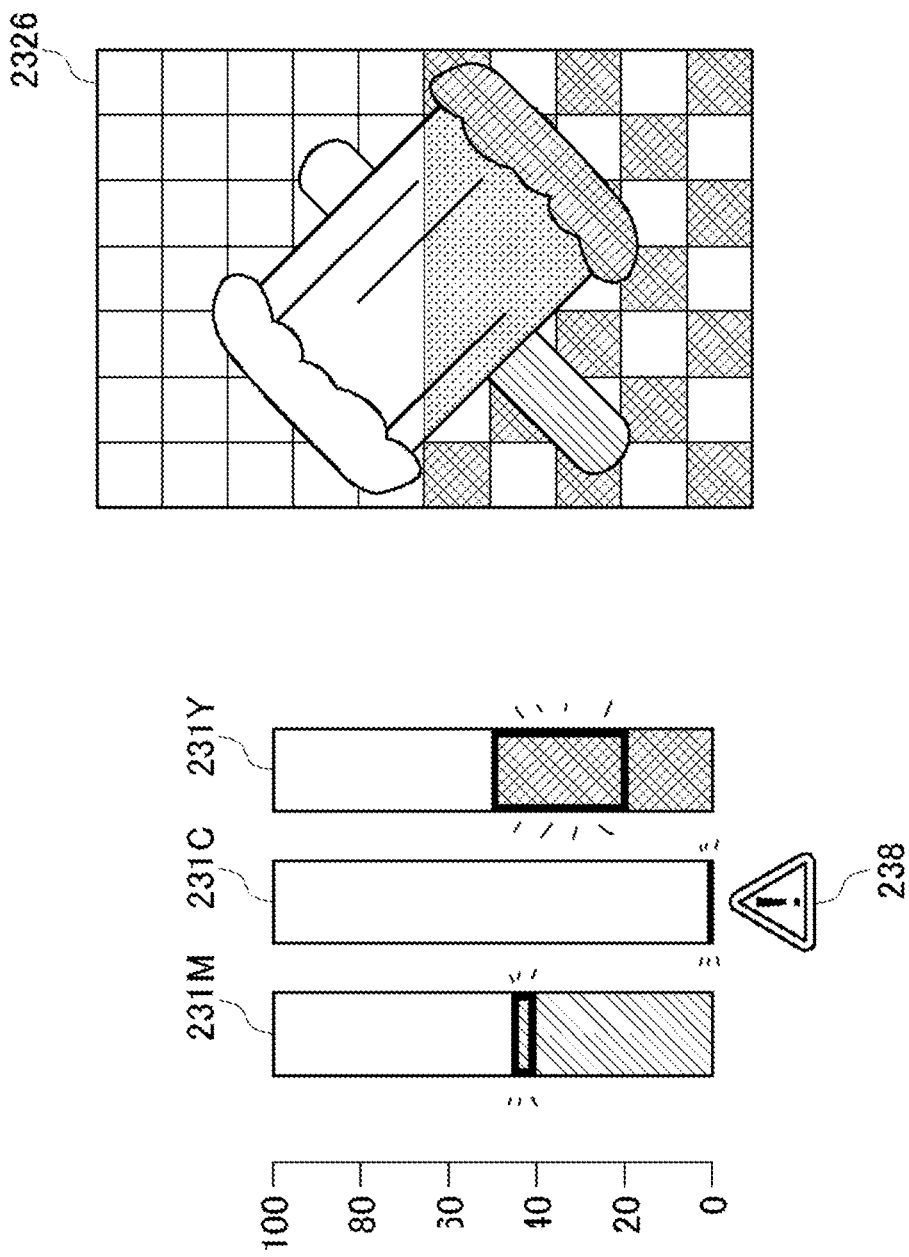
FIG. 10 is a diagram showing an example of a relation of residual amounts of possession paints and coloring of an item card in accordance with the embodiment.

Next, the case in which residual amounts of possession paints are insufficient will be described. FIGS. 9 and 10 are diagrams showing a relation of residual amounts of possession paints and coloring of selection cards. As described above, the user can color the selection cards in the game screen 2304 exemplified in FIG. 7. However, when residual amounts of paints used at that time are insufficient, the user cannot color the selection cards with an original color combination.

Figure 11:
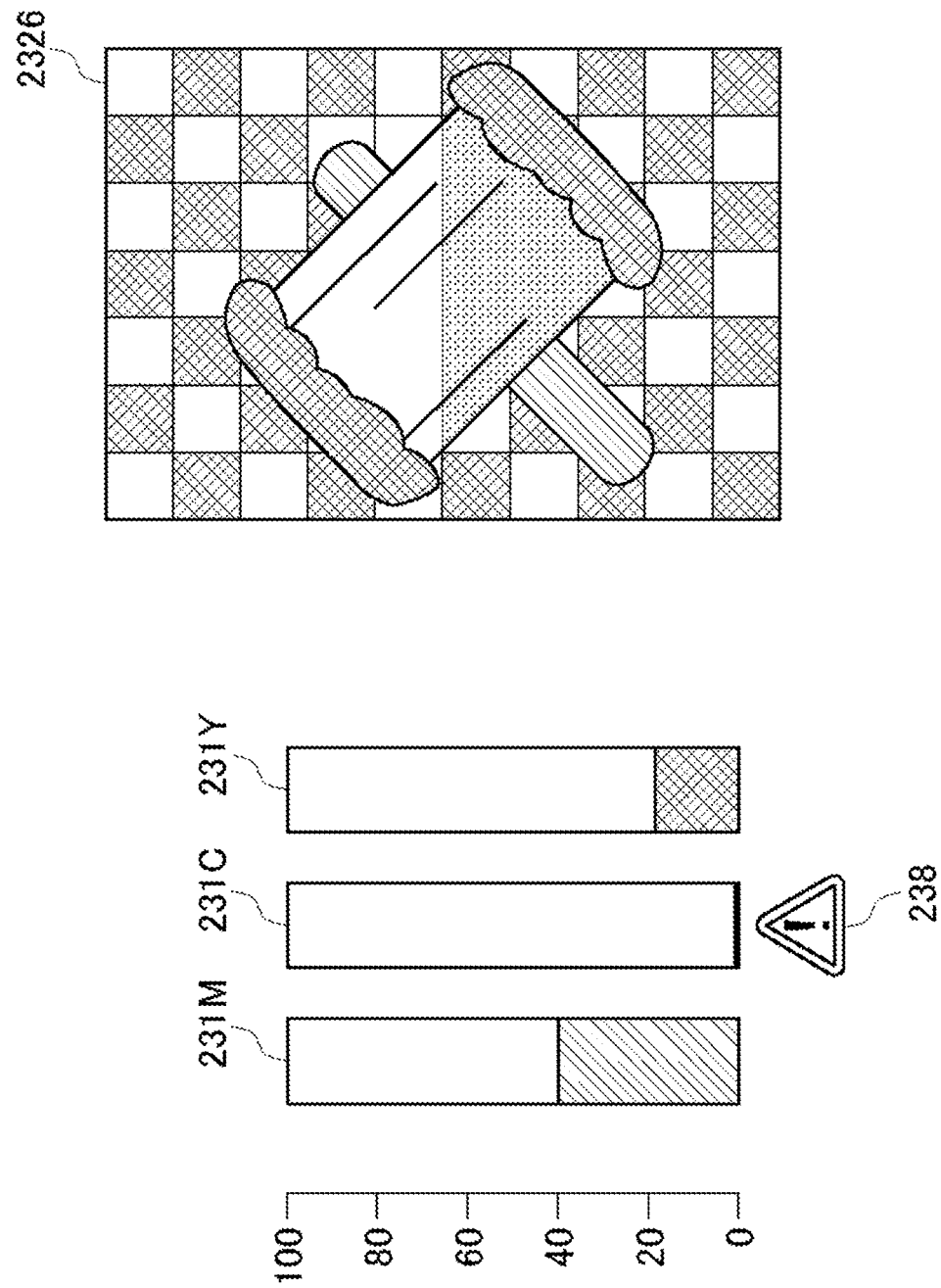
FIG. 11 is a diagram showing an example of a relation of residual amounts of possession paints and coloring of an item card in accordance with the embodiment.

FIGS. 9 to 11 show an example of the case in which the item card 2326 is colored. If the item card 2326 is completely colored, a red paint 10, a blue paint 30, and a yellow paint 60 (a total of 100) are consumed. That is, consumption ratios of the paints of the item card 2326 are red paint:blue paint:yellow paint=10:30:60. As shown in FIG. 9, if a residual amount of red paint is 50, a residual amount of blue paint is 15, and a residual amount of yellow paint is 80, an amount of blue paint is insufficient by 15 for coloring the item card 2326 completely. As shown in FIG. 9, when the residual amount of paint is small, a caution mark 238 is displayed on the indicator of the blue possession paint 231C.

In this state, if the item card 2326 is touched and is colored gradually from a lower side, all the red, blue, and yellow paints are sufficient to 50% (a lower half portion) of the item card 2326. For this reason, as shown in FIG. 10, the item card 2326 can be colored with a determined color combination (consumption ratio). If the user continuously performs the touch, the blue paint is already consumed completely. For this reason, as shown in FIG. 11, the remaining portion (upper half portion) is colored with only the red paint and the yellow paint other than the blue paint.

As a result, the item card 2326 is originally colored with a color combination of the red paint 10, the blue paint 30, and the yellow paint 60. However, in a state of FIG. 11, the item card 2326 is colored with a color combination of the red paint 10, the blue paint 15, and the yellow paint 60. In addition, for a total consumption amount of paints, paints of a total of 100 of the red paint 10, the blue paint 30, and the yellow paint 60 are originally consumed. However, only paints of a total of 85 of the red paint 10, the blue paint 15, and the yellow paint 60 are consumed. The attack capability decreases according to a decrease in the total consumption amount of paints.

As such, in this embodiment, even when the residual amount of possession paint is insufficient, the selection card can be colored with the consumption ratios determined for the selection card, using the entire of the residual amount of the paint, and the selection card is colored with only the remaining paints when the residual amount of paint becomes zero. As a result, a coloring area of the insufficient color is decreased according to the amount of insufficient paint and the selection card is colored. In addition, the user can input the selection card colored as described above to the battle and can use the selection card (can make the attack corresponding to the item card).

In other words, when at least one of the paints to be used is insufficient, the consumption ratios of the paints determined for the selection card are changed and the selection card is colored. In this case, the user can visually confirm that there is the insufficient paint and the selection card is not colored completely and that the consumption ratios of the paints are changed, by the selection card colored incompletely as described above.

In addition, the user can arbitrarily determine a coloring amount of the selection card in a range of 0 to 100%. When the paint is insufficient, the selection card cannot be colored completely at the determined consumption ratios and the attack capability decreases by a non-coloring amount. Furthermore, the user can input the selection card to the battle without coloring the selection card at all and can use the selection card. In this case, the attack capability does not become 0. However, the attack capability is minimally set.

Figure 12:
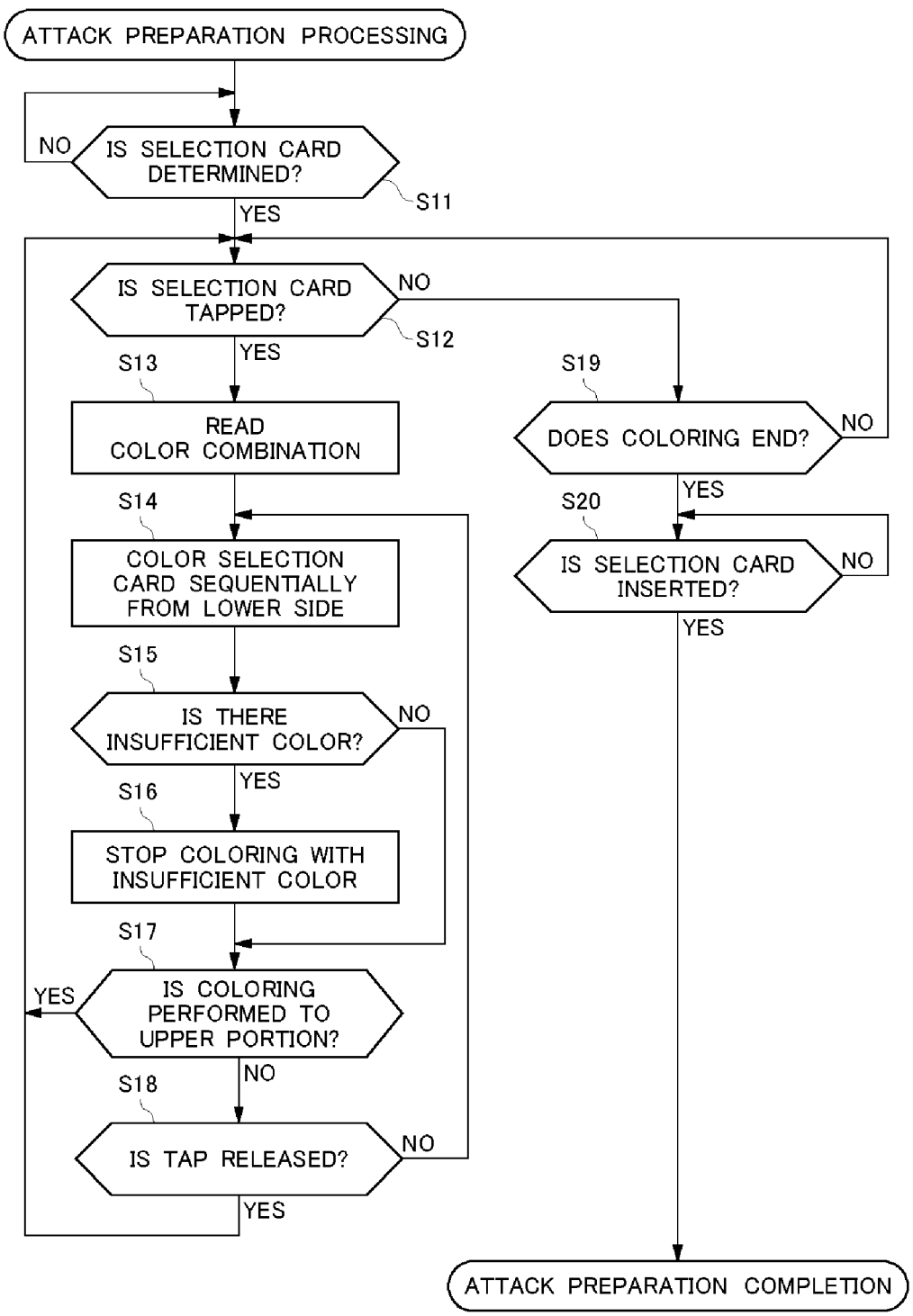
FIG. 12 is a flow diagram showing an example of processing in a battle scene in accordance with the embodiment.

FIG. 12 is a flow diagram showing an example of a method executed by the game processor 12 of the gaming system 1 according to this embodiment. The flow diagram of FIG. 12 shows a flow of processing in the battle scene. If the game processor 12 proceeds to the battle scene, first, the game processor 12 determines whether selection of the item card is completed and the selection card is determined (whether the selection completion button 236 shown in FIG. 5 is designated) (step S11). When the selection card is not determined (NO in step S11), the game processor 12 repeats step S11 and waits for determination of the selection card.

When the selection card is determined (when the selection completion button 236 shown in FIG. 5 is designated) (YES in step S11), the game processor 12 determines whether the selection card is touched (designated) (step S12). When the selection card is touched (YES in step S12), the game processor 12 reads a color combination of the selection card from the game software (step S13) and colors the selection card sequentially from the lower side (step S14).

At this time, the game processor 12 determines whether there is an insufficient color, that is, a color of the paint which is already consumed completely (step S15). When there is the insufficient color (YES in step S15), the game processor 12 stops coloring with the insufficient color (step S16) and determines whether coloring is performed to an upper portion of the selection card (step S17). When there is no insufficient color (NO in step S15), the game processor 12 does not stop coloring with any colors and determines whether coloring is performed to the upper portion of the touched selection card (step S17).

When coloring is not performed to the upper portion (NO in step S17), the game processor 12 determines whether the touch is released (step S18). When coloring is not performed to the upper portion and the touch is not released (NO in both steps S17 and S18), the game processor 12 returns to step S14 and continuously performs coloring of the selection card. When coloring is completed to the upper portion of the selection card or the touch is released (YES in either one of step S17 or S18), the game processor 12 determines whether a new selection card is touched (step S12).

When the new selection card is not touched (NO in step S12), the game processor 12 determines whether coloring ends (whether the coloring end button 237 of the game screen 2303 shown in FIG. 6 is touched) (step S19). When the coloring end button 237 is not touched (NO in step S19), the game processor 12 returns to step S12 and maintains a waiting state until the new selection card is touched or the colored selection card is inserted.

When the coloring end button 237 is touched (YES in step S19), the game processor 12 determines whether insertion of the selection card is commanded (whether a flick operation is executed in the game screen 2304 shown in FIG. 7) (step S20). When the selection card is inserted (YES in step S20), the game processor 12 displays the game screen exemplified in FIG. 8 on the display device 30 and completes an attack preparation.

As such, according to the gaming system 1 according to this embodiment, the item card showing the kind of the attack of the player character is colored with the plurality of paints, so that the amounts of paints consumed by the attack (the magnitudes of the damages given to the enemy characters by the attack) are visually represented. Here, because the paints are elements of coloring in the game, instead of the paints, other coloring elements such as inks may be used. When there is the insufficient color, coloring with the insufficient color is stopped and the selection card is colored with only the sufficient colors, so that an original color combination is changed and the item card is colored in an incomplete state. In addition, it is permitted that the attack is made using the item card colored incompletely.

In addition, the user can adjust a total amount of paints coloring the item card, that is, a total amount of paints consumed by using the item card and the attack capability of the attack using the item card (the magnitude of the damage given to the enemy character by the attack) increases or decreases according to the total amount of colored paints. Therefore, even when there is the paint insufficient for coloring the certain item card, the attack capability decreases only by the insufficient amount and the attack using the item card can be made.

In the embodiment, the example of the case in which the present disclosure is applied to the attack of the player character in the turn-based battle has been described. However, the present disclosure is not limited thereto and may be applied to an active time battle in which the player character and the enemy character can make the attack at the same time.

In the embodiment, the example of the case in which the present disclosure is applied to the attack in the battle scene of the action adventure has been described. However, the action in the game is not limited thereto and the game may be a role playing game (RPG), for example. In addition, the game may be a sports game. In addition, the game may be a puzzle game. In the case of the sports game, the action can be implemented as a sports skill (for example, a shot skill in golf and a pitching skill of a pitcher in baseball). In this case, an effect of the action may be forcefulness (a flight distance of the shot and a ball speed of pitching) or precision of the skill.

In each case, ratios of a plurality of parameters consumed by executing the action are determined in the action. When the action is executed, the user can set amounts of parameters consumed by the action and an effect of the action is determined according to the amounts of consumed parameters. When any parameter is insufficient, the determined consumption ratios may be changed and the consumed parameters may be set.

In the embodiment, the user can select the item card to execute the action, from the plurality of item cards. However, the action may be only one kind. In addition, in the embodiment, the plurality of parameters used for executing the action is represented with the different colors. However, the present disclosure is limited thereto and the plurality of parameters may be represented with a plurality of kinds of concepts and a plurality of kinds of items. In addition, in the embodiment, when there is the insufficient color, the total consumption amount of paints decreases according to the insufficient amount, without coloring a portion to be colored with the insufficient color. However, when there is the insufficient color, the total consumption amount of paints may not be changed by coloring the portion to be colored with the insufficient color with the other colors and changing the consumption ratios.

In the embodiment, the main information processor 12 functions as the game processor to execute the game processing. However, the controller information processor 22 may function as the game processor to execute the game processing. In addition, in the embodiment, the example of the case in which the non-colored item card 232 is not colored has been described (refer to FIGS. 4, 5, and 9). However, the non-colored item card may be colored lightly with a paint color set by an operation of coloring of the user. As a result, the user views the non-colored item card, so that the user can visually grasp amounts of paints of the individual colors to be consumed or consumption ratios of the paints of the individual colors.

What is claimed is:

1. A gaming device for executing a game on the basis of an operation of a user, the gaming device comprising:
   a memory device configured to store values of a plurality of parameters to be consumed respectively; and
   a game processor configured to consume at least one of the plurality of parameters to execute an action in the game, reflect an effect of the executed action in the game, decrease the value of each of the at least one of the parameters stored in the memory device, according to consumption of the at least one of the parameters, and generate a game screen displayed on a display device, wherein
   consumption ratios of the plurality of parameters are determined for the action, the consumption ratios indicating relations among amounts of the plurality of parameters to be consumed for executing the action, and
   the game processor consumes the at least one of the plurality of parameters according to the consumption ratios determined for the action and executes the action, when the at least one of the parameters necessary for the action to be executed is insufficient, the game processor changes the consumption ratios and executes the action, when the consumption ratios change, the game processor generates a game screen different from a game screen when the consumption ratios do not change, and when the consumption ratios change, the game processor reflects an effect in the game, the effect being different from an effect when the consumption ratios do not change.

2. The gaming device according to claim 1, wherein when the consumption ratios change, the game processor generates a game screen in which colors different from colors when the consumption ratios do not change are displayed.

3. The gaming device according to claim 1, wherein the game processor executes an action selected by a user from a plurality of actions, consumption ratios determined for the plurality of actions are different from each other.

4. The gaming device according to claim 3, wherein the game processor generates game images including images of cards, the cards corresponding to the plurality of actions respectively, and
   the plurality of parameters correspond to different colors, and consumption ratios of the different colors are determined for each of the plurality of actions.

5. The gaming device according to claim 4, wherein the game processor colors a card selected from the cards by the user with a color combination corresponding to the consumption ratios of the different colors determined for an action corresponding to the selected card, and when one of the plurality of parameters is insufficient, the game processor diminishes a coloring area of a color corresponding to the insufficient parameter, according to an insufficient amount of the insufficient parameter.

6. The gaming device according to claim 1, wherein the game processor adjusts a total consumption amount of the plurality of parameters for executing the action to an adjusted total consumption amount, based on a user input, consumes the plurality of parameters according to the adjusted total consumption amount, and reflects an effect in the game according to amounts of the consumed parameters.

7. The gaming device according to claim 1, wherein the game processor generates game images showing the values of the plurality of parameters stored in the memory device.

8. The gaming device according to claim 1, wherein the game processor increases or decreases each of the plurality of parameters stored in the memory device, by a factor other than consumption of the parameters for execution of the action.

9. The gaming device according to claim 1, wherein the action is an attack which a player character operated by the user makes on another character, and the effect is a damage which the another character receives.

10. A non-transitory storage medium having stored therein a game program for execution by a computer having a memory device and being connected to a display device, the game program comprising instructions that, when executed by the computer, causing the computer to perform:
    a storing processing which stores values of a plurality of parameters to be consumed in a game respectively in the memory device;
    a first game processing which consumes at least one of the plurality of parameters to execute an action in the game;
    a second game processing which reflects an effect of the executed action in the game; and
    a third game processing which generates a game screen displayed on the display device, wherein
    the first game processing consumes at least one of the plurality of parameters according to consumption ratios determined for the action and executes the action, the consumption ratios indicating relations among amounts of the plurality of parameters to be consumed for executing the action, and when at least one of the parameters necessary for the action to be executed is insufficient, the first game processing changes the consumption ratios and executes the action,
    the storing processing decreases the value of each of the at least one of the parameters stored in the memory device, according to consumption of the at least one the parameters,
    when the consumption ratios change, the third game processing generates a game screen different from a game screen when the consumption ratios do not change, and
    when the consumption ratios change, the second game processing reflects an effect in the game, the effect being different from an effect when the consumption ratios do not change.

11. The non-transitory storage medium according to claim 10, wherein
    when the consumption ratios change, the third game processing generates a game screen in which colors different from colors when the consumption ratios do not change are displayed.

12. The non-transitory storage medium according to claim 10, wherein
    the first game processing executes an action selected by a user from a plurality of actions, consumption ratios determined for the plurality of actions are different from each other.

13. The non-transitory storage medium according to claim 12, wherein the third game processing generates game images including images of cards, the cards corresponding to the plurality of actions respectively, and the plurality of parameters correspond to different colors, and consumption ratios of the different colors are determined for each of the plurality of actions.

14. The non-transitory storage medium according to claim 13, wherein the third game processing colors a card selected from the cards by the user with a color combination corresponding to the consumption ratios of the different colors determined for an action corresponding to the selected card, and when one of the plurality of parameters is insufficient, the third game processing diminishes a coloring area of a color corresponding to the insufficient parameter, according to an insufficient amount of the insufficient parameter.

15. The non-transitory storage medium according to claim 14, wherein the first game processing adjusts a total consumption amount of the plurality of parameters for executing the action to an adjusted total consumption amount, based on a user input, and consumes the plurality of parameters according to the adjusted total consumption amount, and the second game processing reflects an effect in the game according to amounts of the consumed parameters.

16. The non-transitory storage medium according to claim 10, wherein the third game processing generates game images showing the values of the plurality of parameters stored in the memory device.

17. The non-transitory storage medium according to claim 10, wherein the storing increases or decreases each of the plurality of parameters stored in the memory device, by a factor other than consumption of the parameters for execution of the action.

18. The non-transitory storage medium according to claim 10, wherein the action is an attack which a player character operated by a user makes on another character and the effect is a damage which the another character receives.

19. A gaming method for executing a game on the basis of a user input, the gaming method comprising:

a first game processing which consumes at least one of a plurality of parameters to be consumed and executes an action in the game;

a second game processing which reflects an effect of the executed action in the game;

a third game processing which decreases a value of each of the at least one of the plurality of parameters, according to consumption of the at least one of the parameters; and a fourth game processing which generates a game screen displayed on a display device, wherein consumption ratios of the plurality of parameters are determined for the action, the consumption ratios indicating relations among amounts of the plurality of parameters to be consumed for executing the action, in the first game processing, the at least one of the plurality of parameters is consumed according to the consumption ratios determined for the action and the action is executed and when the at least one of the parameters necessary for the action to be executed is insufficient, the consumption ratios are changed and the action is executed, in the fourth game processing, when the consumption ratios change, a game screen different from a game screen when the consumption ratios do not change is generated, and in the second game processing, when the consumption ratios change, an effect is reflected in the game, the effect being different from an effect when the consumption ratios do not change.

20. A gaming system for executing a game on the basis of an operation of a user, the gaming system comprising:

a memory device configured to store values of a plurality of parameters to be consumed by a user respectively;

a game processor configured to consume at least one of the plurality of parameters to execute an action in the game, reflect an effect of the executed action in the game, and decrease the value of each of the at least one of the parameters stored in the memory device, according to consumption of the at least one of the parameters; and a display device configured to display a game screen, wherein consumption ratios of the plurality of parameters are determined for the action, the consumption ratios indicating relations among amounts of the plurality of parameters to be consumed for executing the action, the game processor consumes the at least one of the plurality of parameters according to the consumption ratios determined for the action to be executed and executes the action and when the at least one of the parameters necessary for the action to be executed is insufficient, the game processor changes the consumption ratios and executes the action, when the consumption ratios change, the game processor reflects an effect in the game, the effect being different from an effect when the consumption ratios do not change, and when the consumption ratios change, the display device displays a game screen different from a game screen when the consumption ratios do not change.

21. A gaming device for executing a game based on operations of a user, the gaming device comprising:

a storage configured to store values of a plurality of parameters to be consumed in the game respectively in association with the user; and a game processor configured to:

determine consumption ratios of the plurality of parameters for executing an action in the game, the consumption ratios comprising relations among amounts of the plurality of parameters to be consumed for executing the action;

determine whether at least one of the plurality of parameters for executing the action is insufficient;

upon determining that at least one of the plurality of parameters for executing the action is insufficient, change the consumption ratios for the action and reflect an effect in the game indicating the change of the consumption ratios;

execute the action and reflect an effect of the executed action in the game; and after executing the action, decrease the stored values of at least one of the plurality of parameters based on the determined consumption ratios, and generate a game screen to be displayed on a display device.

* * * * *